3,500,885
NUT LOCK
Charles E. Gutshall, Roselle, Ill., assignor to Illinois Tool Works Inc., Chicago, Ill., a corporation of Delaware
Filed Sept. 9, 1968, Ser. No. 758,282
Int. Cl. F16b 39/08
U.S. Cl. 151—29    5 Claims

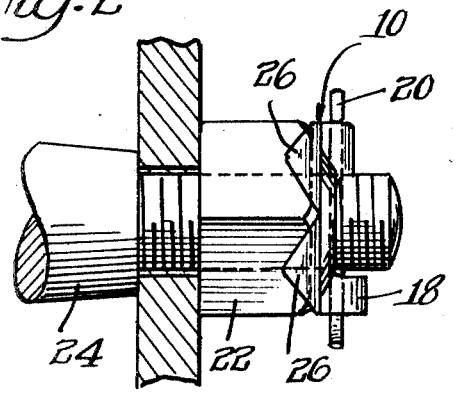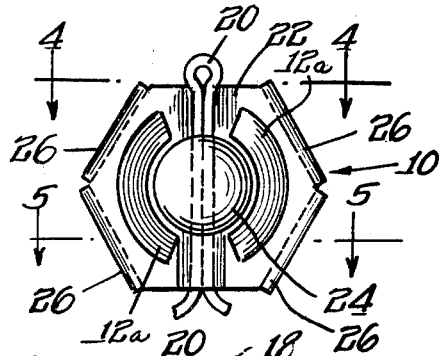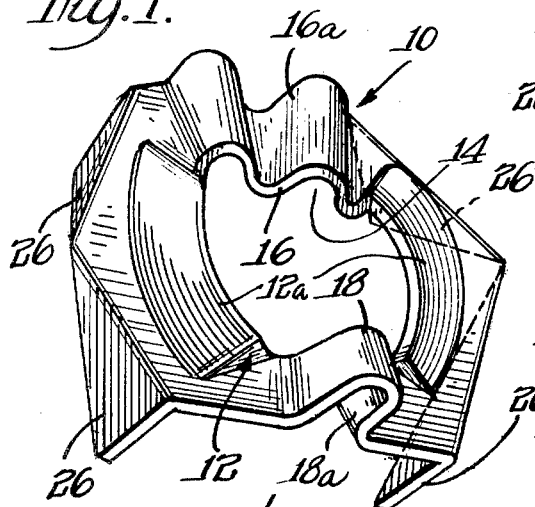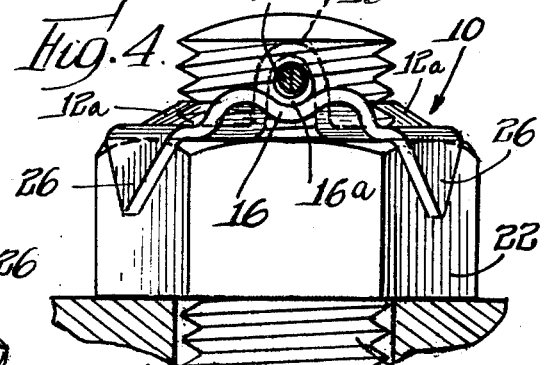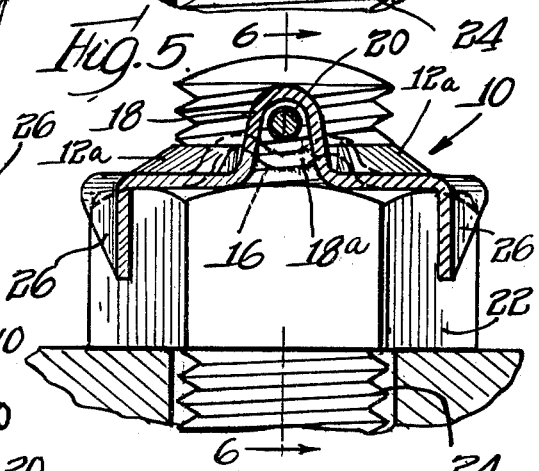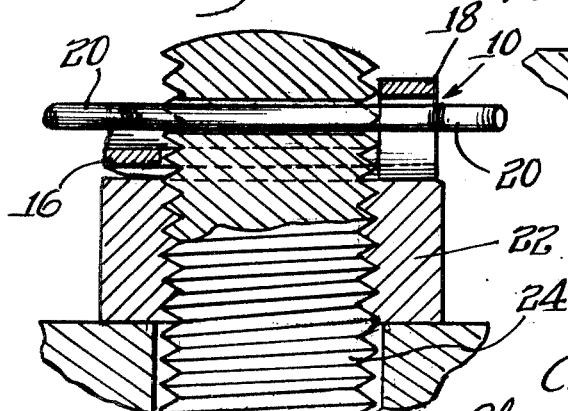
Inventor
Charles E. Gutshall
By: Olson, Trexler, Wotter & Bushnell United States Patent Office 3,500,885
Patented Mar. 17, 1970

ABSTRACT OF THE DISCLOSURE

The present invention relates generally to nut locks and more particularly to cotter pin accommodating nut locks adapted to be formed from sheet metal. The embodiment disclosed herein includes a sheet metal washer member having an annular body section. Diametrically disposed U-shaped portions of the body section are deflected in opposite axial directions to provide transversely aligned cotter pin accommodating openings. The outer margin of the body section is provided with tab members for impinging the periphery of an associated nut member to prevent relative rotation of such nut and washer members.

DESCRIPTION

It is an object of the present invention to provide a very simple yet efficiently operable nut locking device capable of being stamped and formed from sheet metal.

More specifically, the present invention contemplates a nut lock of the type referred to above having transversely aligned openings for accommodating a cotter pin.

The present invention also contemplates the provision of a sheet metal type nut lock which, in addition to accommodating a cotter pin, is adapted to interlock with the peripheral side of a complementary nut member to secure the associated parts against relative rotation.

The foregoing and other objects and advantages will be more apparent from the following detailed description when considered in connection with the accompanying drawing, wherein:

FIG. 1 is a perspective view of one embodiment of a sheet metal nut lock of the type contemplated by the present invention;

FIG. 2 is a side elevational view of the nut lock of FIG. 1 shown in operative association with a nut, said nut being associated with the threaded extremity of a workpiece;

FIG. 3 is an end elevational view as seen from the right of FIG. 2;

FIG. 4 is a side elevational view as seen along the line 4—4 of FIG. 3;

FIG. 5 is a transverse sectional view taken substantially along the line 5—5 of FIG. 3; and FIG. 6 is a vertical sectional view taken substantially along the line 6—6 of FIG. 5.

Referring now to the drawing, wherein like numerals have been employed to designate similar parts throughout the various figures, it will be seen that one embodiment of a sheet metal nut lock of the type contemplated by the present invention is designated generally by the numeral 10, FIG. 1. The sheet metal washer member or nut lock 10 includes an annular body section 12 which defines a central aperture 14. Diametrically located portions of the annular body 12 are flexed in opposite directions so as to present a U-shaped member 16 on one side and a complementary U-shaped member 18 on the opposite side. Attention is directed to the fact that the closed portion of the U-shaped member 16 extends axially of one side of the body 12, while the closed portion of the U-shaped member 18 extends axially of the body in an opposite direction. These U-shaped portions 16 and 18 provide transversely aligned apertures 16a and 18a, respectively. Such transversely aligned apertures are designed to accommodate a cotter pin 20 in a manner presently to be described.

In FIGS. 2 to 6 inclusive, the nut lock 10 is disclosed in operative association with a complementary nut member 22. The nut member 22 is shown in threaded engagement with a supporting spindle, shaft or workpiece 24. When the nut 22 has been applied to the threaded extremity of the workpiece 24 and moved to its desired position, the nut lock or washer member 10 may then be telescopically associated with the free extremity of the threaded workpiece or spindle 24. The threaded extremity of the workpiece 24 is transversely apertured to accommodate the cotter pin 20. In this position, the transversely aligned openings 16a and 18a formed by the U-shaped, axially deflected portions 16 and 18, respectively, are in alignment with the cotter pin accommodating recess in the threaded member 24. Hence, the cotter pin 20 may be inserted within one of the transversely aligned openings 16a, 18a and thence through the aperture provided in the threaded member 24 the free or entering extremity of the cotter pin 20 will extend through the opposite opening in the nut lock.

Attention is directed to a plurality of tab members 26 formed integrally with and extending axially from the outer margin of the body section 12. Adjacent tabs on one side of the washer overlie complementary side surfaces of the nut and the pair of oppositely disposed and adjacently positioned tabs 26 overlie the diametrically disposed surfaces of the nut 22. In the disclosed embodiment a hexagonal nut is shown, and therefore two pairs of diametrically disposed tabs serve to engage a complementary pair of side surfaces of the hexagonal nut. While the periphery of the washer body 12 in the disclosed embodiment is hexagonal in shape, it will be understood that other polygonal shapes are contemplated by the present invention. The impingement or engagement of the tabs 26 with complementary side surfaces of the nut 22 serves to secure the washer and nut against relative rotation.

It is preferable to have the portions of the annular body section 12 which extend circumferentially between the U-shaped members or portions 16 and 18 deflected axially so as to present in transverse cross-section a frustoconical contour. These circumferentially extending portions are designated by the numeral 12a. This frustoconical or axially deflected area of the annular body lends considerable strength to the washer and contributes materially to the efficient functioning of the washer as a nut lock.

The frustoconical portions 12a are preferably of a height such as to prevent the cotter pin 20 from traversing this circumferential area. The height of the portions 12a should relate to the tolerance of the dimension between the top nut surface and the cotter pin hole whereby portions 12a prevent entry of the cotter pin at any point along the inner periphery of the washer other than openings 16a and 18a provided by the locking members 16 and 18 respectively.

It will be apparent from the foregoing description that a nut lock of the sheet metal type contemplated by the present invention may be produced by practicing conventional stamping and forming methods and hence may be produced very economically. By having the closed extremities of the U-shaped portions of the washer body disposed axially in opposite directions, unauthorized axial dislodgment of the washer with respect to the nut is precluded. Thus, the means in the form of the tabs for engaging the nut periphery and the oppositely deflected U-shaped body portions cooperate to secure the washer member against relative rotation and axial separation.

The foregoing structural features, in combination with the frustoconical shape of the body portions extending between the U-shaped members, cooperate to present a novel, inexpensive, and highly efficient nut lock.

The invention is claimed as follows:

1. A nut lock in the form of a washer member including an annular body section, said body section at diametrically opposed locations presenting radial U-shaped portions, one of said U-shaped portions opening axially in a given direction and the other U-shaped portion opening axially in the opposite direction, said U-shaped portions defining transversely and radially aligned cotter pin accommodating openings, the closed extremities of said U-shaped members adapted to adjacently traverse opposite peripheral surface areas of an associated cotter pin, and means associated with the washer body for engaging the periphery of a complementary nut member to secure the washer and such nut member against relative rotation.

2. A nut lock as set forth in claim 1 wherein the means for engaging the periphery of a complementary nut member include elements extending axially from the outer margin of said annular body section along areas extending circumferentially between said U-shaped portions.

3. A nut lock as set forth in claim 1 wherein the outer periphery of the annular body section is hexagonal in shape and the means for engaging the periphery of a complementary hexagonal nut include tabs extending axially from at least two pairs of oppositely disposed peripheral edges of the body section.

4. A nut lock in the form of a lock washer including an annular body section, said body section at diametrically opposite locations presenting radial U-shaped portions, the legs of one U-shaped portion extending from the bight thereof in a given axial direction, and the legs of the other U-shaped portion extending from the bight thereof in an opposite axial direction, said U-shaped portions defining transversely aligned cotter pin accommodating openings, the area of the body section extending between the U-shaped portions being axially deflected with respect to the plane of the washer so as to lend lateral strength to said body section, and means associated with the washer body for engaging the periphery of a complementary nut member to secure the washer and such nut member against relative rotation.

5. A nut lock as set forth in claim 4 wherein the area of the body section extending between the U-shaped portions is substantially frustoconical in axial cross-section.

References Cited

UNITED STATES PATENTS 1,787,114   12/1930   LeLean et al. _____ 151—5

FOREIGN PATENTS

| 115,751 | 5/1918 | Great Britain. |
| 1,091,159 | 10/1954 | France. |
| 721,037 | 5/1942 | Germany. |

MARION PARSONS, JR., Primary Examiner

U.S. Cl. X.R.

151—5